United States Patent
Martin et al.

(10) Patent No.: US 9,220,080 B1
(45) Date of Patent: Dec. 22, 2015

(54) DETERMINING A PROPAGATION-TIME ADJUSTMENT FOR A WIRELESS COVERAGE AREA, BASED ON INFORMATION PROVIDED BY WIRELESS TERMINALS

(71) Applicant: Polaris Wireless, Inc., Mountain View, CA (US)

(72) Inventors: Robert Lewis Martin, Antioch, CA (US); David Stevenson Spain, Jr., Portola Valley, CA (US)

(73) Assignee: Polaris Wireless, Inc., Mountain View, CA (US)

(*) Notice: Subject to any disclaimer, the term of this patent is extended or adjusted under 35 U.S.C. 154(b) by 0 days.

(21) Appl. No.: 14/694,151

(22) Filed: Apr. 23, 2015

(51) Int. Cl.
*H04W 24/00* (2009.01)
*H04W 64/00* (2009.01)
*H04W 24/10* (2009.01)

(52) U.S. Cl.
CPC .............. *H04W 64/00* (2013.01); *H04W 24/10* (2013.01)

(58) Field of Classification Search
CPC ..... G01S 13/767; G01S 13/84; G01S 13/878; G01S 5/02; G01S 5/0263; G01S 5/00; G01S 5/0289; G01S 11/04; G01S 13/588; G01S 13/589; H04W 64/00; H04W 88/08; H04W 24/00; H04W 28/04; H04W 56/006; H04W 4/022; H04W 4/025; H04W 56/003; H04W 64/003; H04W 84/005; H04W 4/023; H04W 4/027; H04W 24/02; H04W 36/30; H04W 56/0065; H04W 72/1226; H04W 84/18; H04W 88/06; H04W 4/02; H04W 16/18; H04W 36/32; H04W 36/14; H04W 4/22; H04W 52/241; H04W 52/265; H04W 56/0045; H04W 92/12; H04W 72/1289; H04W 88/00

See application file for complete search history.

(56) References Cited

U.S. PATENT DOCUMENTS

| | | | |
|---|---|---|---|
| 2007/0249400 A1* | 10/2007 | Kaneko | G01S 3/66 455/562.1 |
| 2008/0058017 A1 | 3/2008 | Carter et al. | |
| 2008/0261612 A1 | 10/2008 | Mia et al. | |
| 2009/0238110 A1* | 9/2009 | Suzuki | H04L 12/5693 370/328 |
| 2013/0100882 A1 | 4/2013 | Johansson et al. | |
| 2013/0252629 A1 | 9/2013 | Wigren et al. | |

OTHER PUBLICATIONS

"Notice of Allowance", dated Sep. 2, 2015 issued in related U.S. Appl. No. 14/792,649.

* cited by examiner

*Primary Examiner* — Nimesh Patel
(74) *Attorney, Agent, or Firm* — Kaplan Breyer Schwarz & Ottesen, LLP

(57) ABSTRACT

A method and system that account for one or more propagation-time components in a transmission path between a base station and a wireless terminal in a coverage area being served by the system. One such component is in the base station equipment between the radio that serves a wireless terminal and the antenna element that radiates and/or receives electromagnetic signals that involve the terminal. Another component of the transmission path is the one or more paths over which a radiated signal travels between the base station antenna element and the wireless terminal. By accounting for these propagation components through the use of measurement data provided by possibly a large number of wireless terminals, a disclosed location engine is able to derive adjusted measurements that are more representative of the propagation-time characteristic being measured by the individual terminals. These adjusted measurements can then be used to estimate the location of a wireless terminal more accurately.

22 Claims, 9 Drawing Sheets

DETERMINING A PROPAGATION-TIME ADJUSTMENT FOR A WIRELESS COVERAGE AREA, BASED ON INFORMATION PROVIDED BY WIRELESS TERMINALS

FIELD OF THE INVENTION

The present invention relates to telecommunications in general, and, more particularly, to a technique for determining an estimate of the location of a wireless terminal that accounts for one or more propagation-time components of a transmission path between a base station equipment component and the same or a different wireless terminal.

BACKGROUND OF THE INVENTION

The salient advantage of wireless telecommunications over wireline telecommunications is that the user of the wireless terminal is afforded the opportunity to use his or her terminal anywhere. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal. In accordance with some techniques, the location of a wireless terminal is estimated, at least in part, from measurements that are reported by the wireless terminal. The reported measurements are of signals measured by the wireless terminal that are transmitted by one or more base stations and, in some cases, by Global Positioning System (GPS) satellites. Some techniques rely on signal-strength measurements, while some other techniques rely on time-based measurements, while still some other techniques rely on other types of measurements. In order for these estimation techniques to work, at least some of the transmitted signals have to be strong enough to allow for accurate measurement by the wireless terminal and for reliable processing by the particular technique.

In some operating scenarios, conditions exist that might be insufficiently or incorrectly characterized by some entity—for example, by the service provider that controls the infrastructure providing service to the wireless terminal. One such condition is propagation time, in which the base station or wireless terminal measures the round-trip time (RTT), or equivalent, of the signal being measured. Here, the service provider might attempt to correct for the component of the propagation time attributed to the base station equipment, by subtracting off the electrical delay of the equipment from the RTT measurement prior to providing the measurement to an application that uses it to locate the wireless terminal. This type of error, as well as other errors, can impair the performance of at least some location estimation techniques in the prior art.

SUMMARY OF THE INVENTION

The present invention enables a telecommunications system to account for one or more propagation-time components in a transmission path between a base station and a wireless terminal in a coverage area being served by the system. One such component is in the base station equipment between the radio that serves a wireless terminal and the antenna element that radiates and/or receives electromagnetic signals that involve the terminal. Another component of the transmission path is the one or more paths over which a radiated signal travels between the base station antenna element and the wireless terminal. By accounting for these propagation components through the use of measurement data provided by possibly a large number of wireless terminals, a location engine disclosed herein is able to derive adjusted measurements that are more representative of the propagation-time characteristic being measured by the individual terminals. These adjusted measurements can then be used to estimate the location of a wireless terminal more accurately.

In accordance with the illustrative embodiment of the present invention, the location engine, implemented on a server computer or other computing device, receives propagation-time measurements of signals between a base station and a wireless terminal in a coverage area being served by the base station, for one or more base stations and/or wireless terminals. For example and without limitation, a propagation-time measurement can be the round-trip time (RTT) measurement made and reported by wireless terminals in certain third-generation (3G) cellular networks. The location engine estimates the location of the wireless terminal at the location that corresponds to where the propagation-time measurement was made, but without using the measurement in the estimate. In other words, the location is estimated based on evidence that is independent of the propagation-time measurement received. In estimating the location in this way, the location engine establishes a "ground truth" against which the propagation-time measurement can be referenced. The location engine then estimates the spatial displacement between the location of the base station and the estimated location of the wireless terminal.

The location engine builds and maintains a data set over time, wherein the data set is made up of comparison values between i) each estimated spatial displacement and ii) the corresponding propagation-time measurement. Each comparison value can be based on the difference between the spatial displacement and propagation-time measurement, provided that one or both of these values are normalized to the other, in terms of units of measure (e.g., time versus distance) and physical condition being represented (e.g., one-way versus round-trip propagation). When the data set is sufficiently large, the location engine generates a statistic of the data set. In at least some embodiments of the present invention, the statistic summarizes i) a measure of location with the data set (e.g., mean, median, predetermined percentile, etc.), ii) a measure of statistical dispersion within the data set (e.g., standard deviation, range, etc.), or iii) a measure of the shape of the distribution of the data set (e.g., skewness, etc.), for example and without limitation.

The location engine then estimates the location of one or more wireless terminals based on the generated statistic. For example and without limitation, the location engine can use the statistic in order to account for one or more components in the received propagation-time measurements by adjusting the measurements accordingly; then, the location engine can use the adjusted measurements in performing a location estimation technique that relies on the measurements. The wireless terminals whose locations are estimated by using the propagation-time measurements can be different from the wireless terminals whose locations are estimated using the independent technique described earlier.

The location engine can use many data points that are provided by each wireless terminal, provided by potentially many wireless terminals, and related to electromagnetic signal transmissions that involve potentially many base stations, thereby leveraging a crowdsourced effect. By using a sufficient amount of data from a sufficient number of sources, the location engine of the illustrative embodiment can compensate for one or more sources of error, including but not limited to:

a. the electrical delay introduced by the base station equipment.

b. any service provider error created in attempting to compensate for the foregoing equipment delay.

c. multipath delay, in which signals between a base station and a wireless terminal travel over one or more indirect paths, often making the base station and the wireless terminal seem farther apart than they physically are.

d. quantization effects in a wireless terminal or base station in measuring and reporting RTT or equivalent.

An illustrative method comprises: receiving, by a server computer: i) a first propagation-time measurement of a first signal in a transmission between a first wireless terminal and a base station, ii) a second propagation-time measurement of a second signal in a transmission that involves the base station, and iii) evidence of the location of the first wireless terminal; estimating, by the server computer, the location of the first wireless terminal based on the evidence of the location of the first wireless terminal; estimating, by the server computer, a first spatial displacement between the first wireless terminal and the base station, based on the estimated location of the first wireless terminal; generating, by the server computer, a statistic by applying a corresponding, predetermined statistical algorithm to a data set, wherein a first value in the data set is based on i) the first spatial displacement and ii) the first propagation-time measurement, and wherein a second value in the data set is based on the second propagation-time measurement; estimating, by the server computer, the location of a second wireless terminal based on the statistic, resulting in a location estimate; and transmitting, by the server computer, the location estimate to a location-based application.

Another illustrative method comprises receiving, by a server computer: i) a first propagation-time measurement of a signal transmitted between a first wireless terminal and a base station, ii) evidence of the location of the first wireless terminal, iii) a second propagation-time measurement of a signal transmitted between a second wireless terminal and the base station, and iv) evidence of the location of the second wireless terminal; estimating, by the server computer: i) the location of the first wireless terminal based on the evidence of the location of the first wireless terminal, and ii) the location of the second wireless terminal based on the evidence of the location of the second wireless terminal; estimating, by the server computer: i) a first spatial displacement between the first wireless terminal and the base station, based on the estimated location of the first wireless terminal, and ii) a second spatial displacement between the second wireless terminal and the base station, based on the estimated location of the second wireless terminal; generating, by the server computer, a statistic by applying a corresponding, predetermined statistical algorithm to a data set, wherein a first value in the data set is based on i) the first spatial displacement and ii) the first propagation-time measurement, and wherein a second value in the data set is based on i) the second spatial displacement and ii) the second propagation-time measurement; estimating, by the server computer, the location of a third wireless terminal based on the statistic, resulting in a location estimate; and transmitting, by the server computer, the location estimate to a location-based application.

Yet another illustrative method comprises: receiving, by a server computer: i) a first propagation-time measurement of a signal transmitted between a first wireless terminal and a base station, ii) evidence of the location of the first wireless terminal, iii) a second propagation-time measurement of a signal transmitted between a second wireless terminal and the base station, and iv) evidence of the location of the second wireless terminal; estimating, by the server computer: i) a first spatial displacement between the first wireless terminal and the base station, based on the evidence of the location of the first wireless terminal, and ii) a second spatial displacement between the second wireless terminal and the base station, based on the evidence of the location of the second wireless terminal; generating, by the server computer, a statistic by applying a corresponding, predetermined statistical algorithm to a data set, wherein a first value in the data set is based on i) the first spatial displacement and ii) the first propagation-time measurement, and wherein a second value in the data set is based on i) the second spatial displacement and ii) the second propagation-time measurement, and wherein the statistic is based on a multipath characteristic of a wireless coverage area serviced by the base station; estimating, by the server computer, the location of a third wireless terminal based on the statistic, resulting in a location estimate; and transmitting, by the server computer, the location estimate to a location-based application.

DETAILED DESCRIPTION

Figure 1:
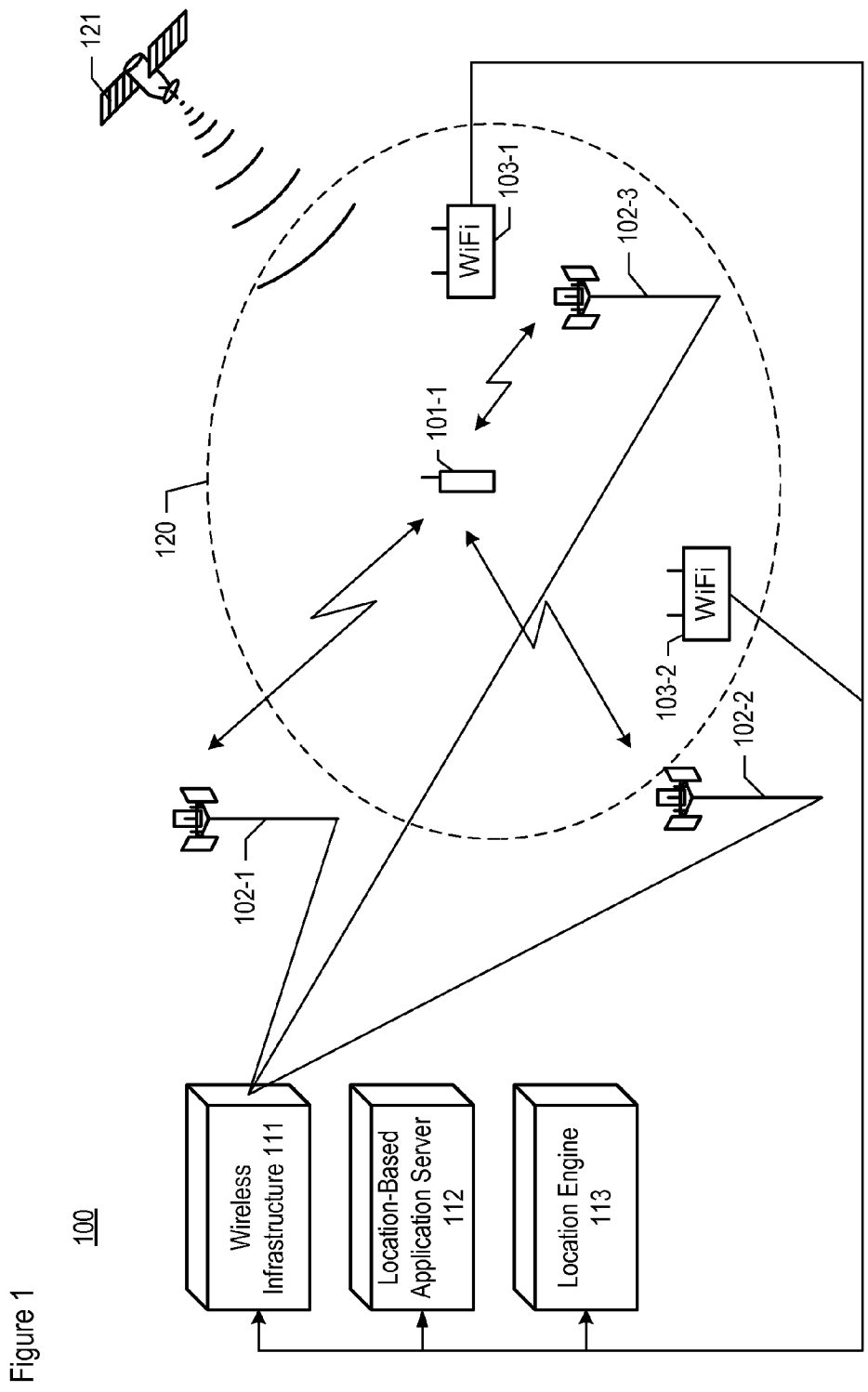
FIG. 1 depicts a diagram of the salient components of wireless telecommunications system 100 in accordance with the illustrative embodiment of the present invention.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Estimate—For the purposes of this specification, the infinitive "to estimate" and its inflected forms (e.g., "estimating", "estimated", etc.) should be given the ordinary and customary meaning that the terms would have to a person of ordinary skill in the art at the time of the invention.

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Location—For the purposes of this specification, the term "location" is defined as a zero-dimensional point, a finite one-dimensional path segment, a finite two-dimensional surface area, or a finite three-dimensional volume.

Processor—For the purposes of this specification, a "processor" is defined as hardware or hardware and software that perform mathematical and/or logical operations.

Propagation time—For the purposes of this specification, "propagation time" is defined as the length of time it takes for a signal to move along a transmission path. A measurement related to propagation time can be time-based; timing-based; delay-based; based on a difference in time, timing, or delay; or based on some combination thereof.

Spatial displacement—For the purposes of this specification, the term "spatial displacement" is defined as the distance along a straight line between two points in space.

Statistic—For the purposes of this specification, the term "statistic" is defined as a single measure of some attribute of a sample, calculated by applying a statistical algorithm to the values of the items of the sample, which are known together as a data set. A "descriptive statistic" can be used to describe the data in a data set.

Radio—For the purposes of this specification, a "radio" is defined as hardware or hardware and software that is capable of telecommunications via an unguided (i.e., wireless) radio signal of frequency less than 600 GHz.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless coverage area—For the purposes of this specification, the term "wireless coverage area" is defined as the geographic area within which a carrier or a set of equipment, or both, provides wireless service.

Wireless terminal—For the purposes of this specification, the term "wireless terminal" is defined as a device that is capable of telecommunications without a wire or tangible medium. A wireless terminal can be mobile or immobile. A wireless terminal can transmit or receive, or transmit and receive. As is well known to those skilled in the art, a wireless terminal is also commonly called a cell phone, a pager, a wireless transmit/receive unit (WTRU), a user equipment (UE), a mobile station, a fixed or mobile subscriber unit, a pager, a cellular telephone, a personal digital assistant (PDA), a computer, and any other type of device capable of operating in a wireless environment are examples of wireless terminals.

FIG. 1 depicts a diagram of the salient components of wireless telecommunications system 100 in accordance with the illustrative embodiment of the present invention. Wireless telecommunications system 100 comprises: wireless terminal 101-1, cellular base stations 102-1, 102-2, and 102-3, Wi-Fi base stations 103-1 and 103-2, wireless infrastructure 111, location-based application server 112, location engine 113, and GPS constellation 121, interrelated as shown.

Wireless infrastructure 111, location-based application server 112, location engine 113, and Wi-Fi base stations 103-1 and 103-2 are all connected to one or more interconnected computer networks (e.g., the Internet, a local-area network, a wide-area network, etc.) and, as such, can exchange data in well-known fashion.

Although the illustrative embodiment depicts wireless telecommunications system 100 as comprising only one wireless terminal, it will be clear to those skilled in the art, after reading this disclosure, how to make and use alternative embodiments of the present invention that comprise any number of wireless terminals 101-1 through 101-M, wherein M is a positive integer.

Wireless terminal 101-1 comprises the hardware and software necessary to perform the processes described below and in the accompanying figures. Furthermore, wireless terminal 101-1 is mobile and can be at any location within geographic region 120 at any time.

Wireless terminal 101-1 is capable of providing bi-directional voice, data, and video telecommunications service to a user (not shown), but it will be clear to those skilled in the art, after reading this disclosure, how to make and use embodiments of the present invention in which wireless terminal 101-1 provides a different set of services.

In accordance with the illustrative embodiment, wireless terminal 101-1 is capable of transmitting one or more radio signals—that can be received by one or more of base stations 102-1, 102-2, and 102-3 and Wi-Fi base stations 103-1 and 103-2—in accordance with specific parameters (e.g., signal strength, frequency, coding, modulation, timing offset, etc.), in well-known fashion, and of transmitting at least some of those parameters to location engine 113 as well as other information described below. Additionally, wireless terminal 101-1 is capable of receiving one or more radio signals from each of base stations 102-1, 102-2, and 102-3, Wi-Fi base stations 103-1 and 103-2, and GPS constellation 121, in well-known fashion.

Wireless terminal 101-1 is also capable of identifying each radio signal it receives, in well-known fashion, and of transmitting the identity of each signal it receives to location engine 113. Wireless terminal 101-1 is further capable of measuring one or more location-dependent traits of each radio signal it receives, in well-known fashion, and of transmitting each measurement it generates to location engine 113.

Cellular base stations 102-1, 102-2, and 102-3 communicate with wireless infrastructure 111 via wireline and with wireless terminal 101-1 via radio in well-known fashion. As is well known to those skilled in the art, base stations are also commonly referred to by a variety of alternative names such as access points, nodes, network interfaces, etc. Although the illustrative embodiment comprises three cellular base stations, it will be clear to those skilled in the art, after reading this disclosure, how to make and use alternative embodiments of the present invention that comprise any number of cellular base stations.

In accordance with the illustrative embodiment of the present invention, cellular base stations 102-1, 102-2, and 102-3 are terrestrial, immobile, and base station 102-3 is within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 102-1, 102-2, and 102-3 comprise the hardware and software necessary to be 3GPP-compliant and to perform the processes described below and in the accompanying figures. For example and without limitation, each of cellular base stations 102-1, 102-2, and 102-3 are capable of continually:
 a. receiving one or more radio signals transmitted by wireless terminal 101-1, and
 b. identifying each radio signal transmitted by wireless terminal 101-1, in well-known fashion, and of transmitting the identity of those signals to location engine 113, and
 c. measuring one or more location-dependent traits of each radio signal transmitted by wireless terminal 101-1, in well-known fashion, and of transmitting the measurements to location engine 113, and
 d. transmitting one or more signals to wireless terminal 101-1 in accordance with specific parameters (e.g., signal strength, frequency, coding, modulation, etc.), in well-known fashion, and of transmitting those parameters to location engine 113.

It will be clear to those skilled in the art how to make and use cellular base stations 102-1, 102-2, and 102-3.

Wi-Fi base stations 103-1 and 103-2 communicate with wireless terminal 101-1 via radio in well-known fashion. Wi-Fi base stations 103-1 and 103-2 are terrestrial, immobile, and within geographic region 120. Although the illustrative embodiment comprises two Wi-Fi base stations, it will be clear to those skilled in the art, after reading this disclosure, how to make and use alternative embodiments of the present invention that comprise any number of Wi-Fi base stations.

Each of Wi-Fi base stations 103-1 and 103-2 are capable of continually:
 a. receiving one or more radio signals transmitted by wireless terminal 101-1, and
 b. identifying each radio signal transmitted by wireless terminal 101-1, in well-known fashion, and of transmitting the identity of those signals to location engine 113, and
 c. measuring one or more location-dependent traits of each radio signal transmitted by wireless terminal 101-1, in well-known fashion, and of transmitting the measurements to location engine 113, and
 d. transmitting one or more signals to wireless terminal 101-1 in accordance with specific parameters (e.g., signal strength, frequency, coding, modulation, etc.), in well-known fashion, and of transmitting those parameters to location engine 113.

It will be clear to those skilled in the art how to make and use Wi-Fi base stations 103-1 and 103-2.

Wireless infrastructure 111 comprises a switch that orchestrates the provisioning of telecommunications service to wireless terminal 101-1 and the flow of information to and from location engine 113, as described below and in the accompanying figures. As is well known to those skilled in the art, wireless switches are also commonly referred to by other names such as mobile switching centers, mobile telephone switching offices, routers, etc.

Location-based application server 112 comprises hardware and software that uses the estimate of the location of wireless terminal 101-1—generated by location engine 113—in one or more location-based applications, in well-known fashion. Location-based applications are well-known in the art and provide services such as, and without limitation, E-911 routing, navigation, location-based advertising, and weather alerts.

Location engine 113 is a data processing system that comprises hardware and software that generates one or more estimates of the location of wireless terminal 101-1 as described below and in the accompanying figures. It will be clear to those skilled in the art, after reading this disclosure, how to make and use location engine 113. Furthermore, although location engine 113 is depicted in FIG. 1 as physically distinct from wireless infrastructure 111, it will be clear to those skilled in the art, after reading this disclosure, how to make and use alternative embodiments of the present invention in which location engine 113 is wholly or partially integrated into wireless infrastructure 111.

Figure 2:
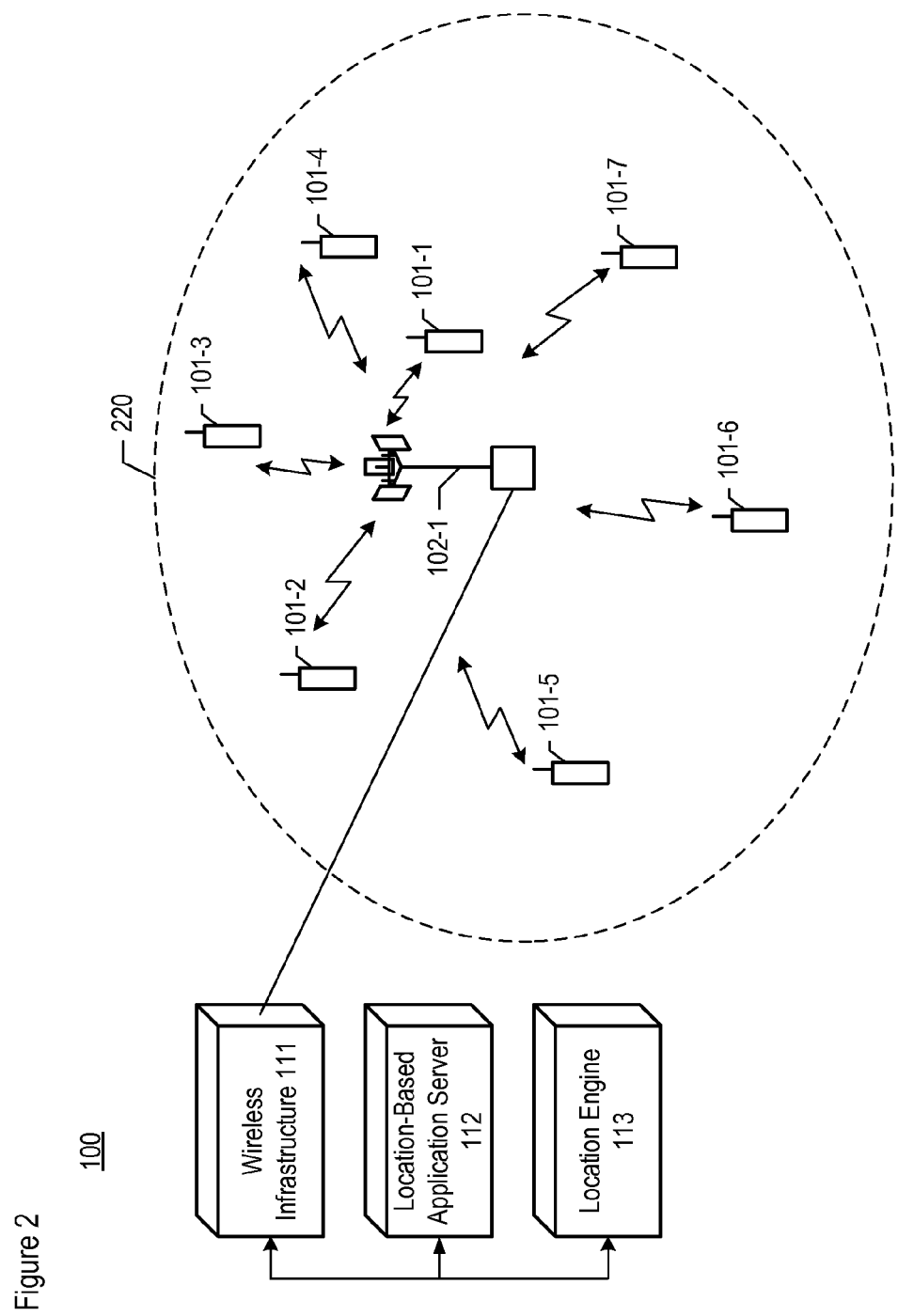
FIG. 2 depicts a diagram of the salient components of wireless telecommunications system 100 that provide telecommunications service to at least some of geographic region 220 or that operate within geographic area 220.

FIG. 2 depicts a diagram of the salient components of wireless telecommunications system 100 that provide telecommunications service to at least some of geographic region 220 or that operate within geographic area 220. In particular, wireless terminals 101-1 through 101-M (wherein M as depicted is equal to 7) operate within area 220, and at least cellular base station 102-1, wireless infrastructure 111, location-based application server 112, and location engine 113 provide service to the wireless terminals and are interrelated as shown.

Some are all of wireless terminals 101-1 through 101-M are in communication with base station 102-1 at any given moment in time. Additionally, some or all of wireless terminals 101-1 through 101-M can also be in communication with one or more base stations in addition to base station 102-1.

As discussed above, wireless terminal 101-$m$, wherein m can have a value of 1 through M, is further capable of measuring one or more location-dependent traits of each radio signal it receives, in well-known fashion, and of transmitting each measurement it generates to location engine 113. At least some of the location-dependent traits are related to propagation time, and, in particular, propagation delay in some cases. Some propagation-time-related measurements that can be provided by terminal 101-$m$ are as follows, for example and without limitation:
 a. the round-trip time (RTT) or round-trip delay time (RTD) of all of the signals transmitted and receivable by wireless terminal 101-$m$ through one or more of the base stations.
 b. the time advance (TA) of all of the signals transmitted and receivable by wireless terminal 101-$m$ through one or more of the base stations.
 c. the received temporal difference of each pair of multipath components (e.g., one temporal difference for one pair of multipath components, a pair of temporal differences for a triplet of multipath components, etc.) of all of the signals receivable by wireless terminal 101-$m$ from one or more transmitters.
 d. the received delay spread (e.g., RMS delay spread, excess delay spread, mean excess delay spread, etc.) of all of the signals receivable by wireless terminal 101-$m$.
 e. the received relative arrival times of two or more multipath components of all of the signals receivable by wireless terminal 101-$m$, from one or more transmitters (which can be determined by a rake receiver in well-known fashion).

Cellular base station 102-1, as well as other base stations within system 100, is further capable of measuring one or more location-dependent traits of each radio signal it receives from one or more wireless terminals, in well-known fashion, and of transmitting each measurement it generates to location engine 113. At least some of the location-dependent traits are related to propagation time, and, in particular, propagation delay in some cases. Some propagation-time-related measurements provided by base station 102-1 are the same as those listed above, for example and without limitation, except that the signal propagation directions are reversed.

By accumulating the aforementioned measurements that are received from one or more of the wireless terminals or base stations, or both, location engine 113 is capable of performing the tasks described below.

Figure 3:
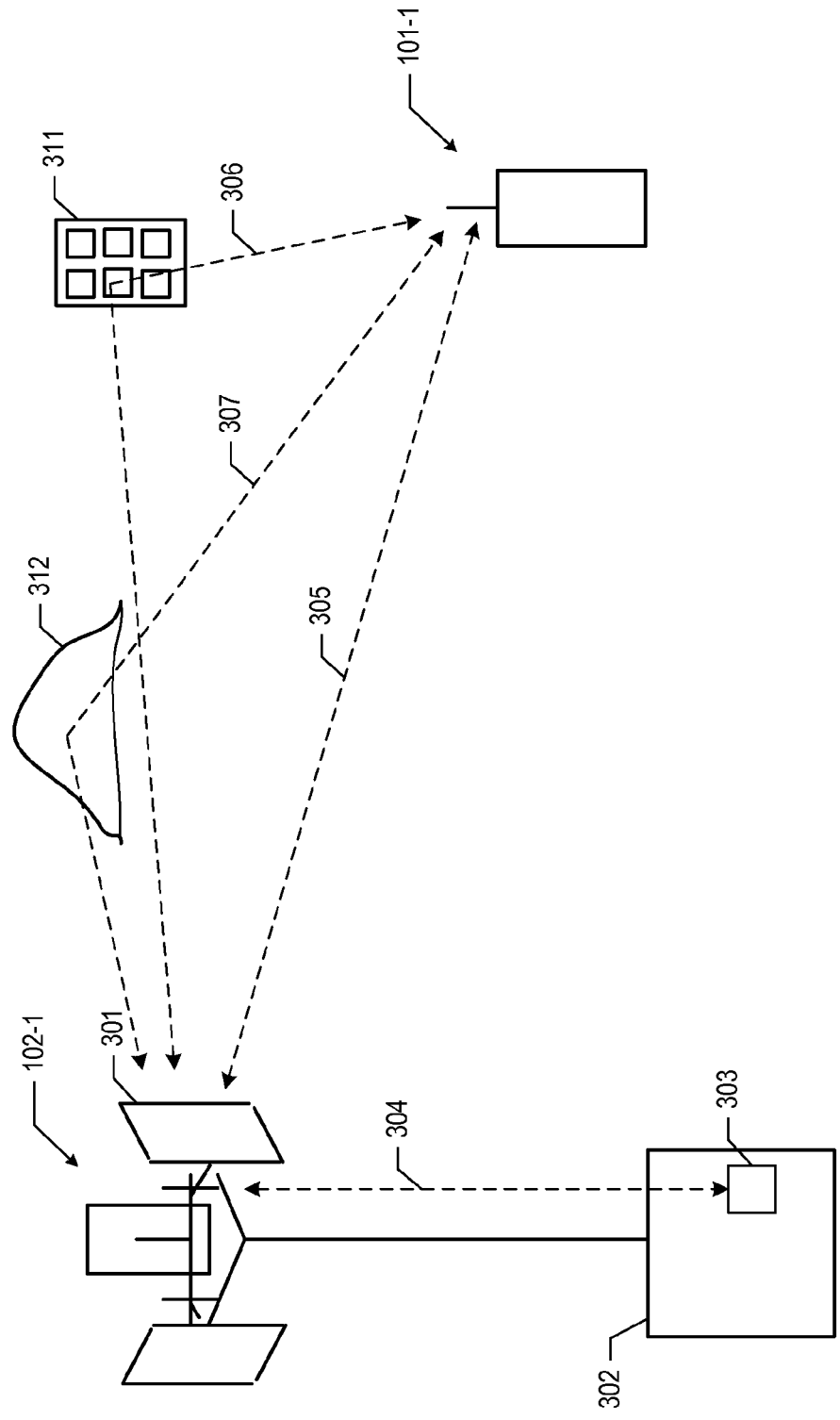
FIG. 3 depicts a diagram of the salient components of cellular base station 102-1, in communication with wireless terminal 101-1.

FIG. 3 depicts a diagram of the salient components of cellular base station 102-1, in communication with wireless terminal 101-1 via a transmission path or paths comprising one or more propagation components. Cellular base station 102-1 comprises: one or more antenna elements 301 and base station processing equipment 302, which comprises one or more radios 303. Signal path 304 between antenna element 301 and radio 303, or between element 301 and a different base station equipment component, is characterized by a first propagation delay component that is attributed to the type and length of transmission medium used (e.g., cable, etc.).

Additionally, there are one or more signal paths taken by a signal transmitted between antenna element 301 and wireless terminal 101-1. Signal path 305, which is a direct path, is characterized by a second propagation delay component; signal path 306, which is an indirect path due to reflection off of building 311, is characterized by a second propagation delay component; and signal path 307, which is an indirect path due to reflection off of mountain 312, is characterized by a third propagation delay component. As those who can appreciate after reading this specification, other signal paths can occur based on reflection from other terrestrial objects and from bodies of water, and on phenomena other than reflection. When radio signals reach a receiving antenna by two or more signal paths, multipath is said to occur.

Wireless terminal 101-1 and/or base station 102-1 are capable of making and providing (e.g., to location engine 113, etc.) propagation-time measurements, in which the measurements reflect at least some of the propagation delay components described above.

Figure 4:
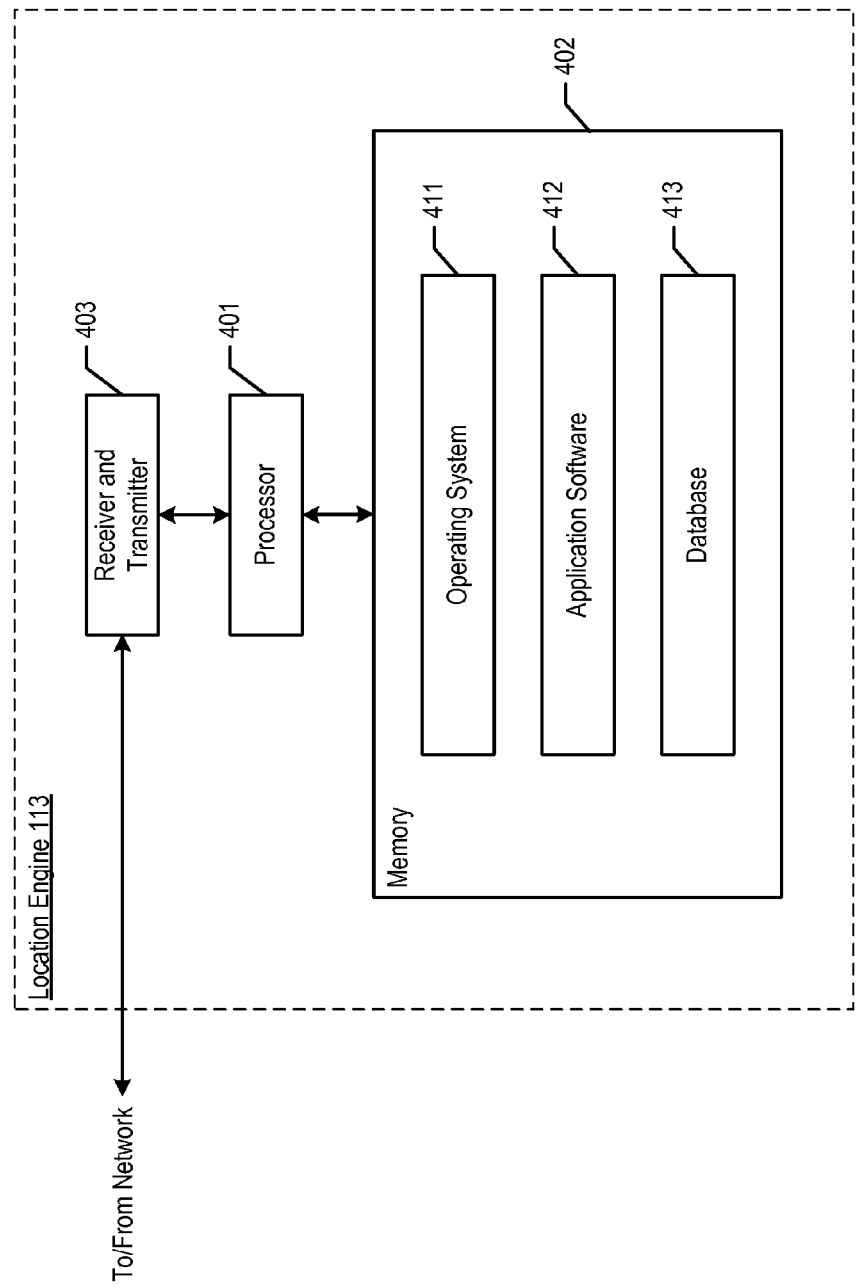
FIG. 4 depicts a block diagram of the salient components of location engine 113 in accordance with the illustrative embodiment.

Location engine 113—FIG. 4 depicts a block diagram of the salient components of location engine 113 in accordance with the illustrative embodiment. Location engine 113 comprises: processor 401, memory 402, and receiver and transmitter 403, which are interconnected as shown. In accordance with the illustrative embodiment of the present invention, location engine 113 is a server computer. As those who are skilled in the art will appreciate after reading this specification, however, location engine 113 can be a different type of data-processing system or computing device.

Figure 5:
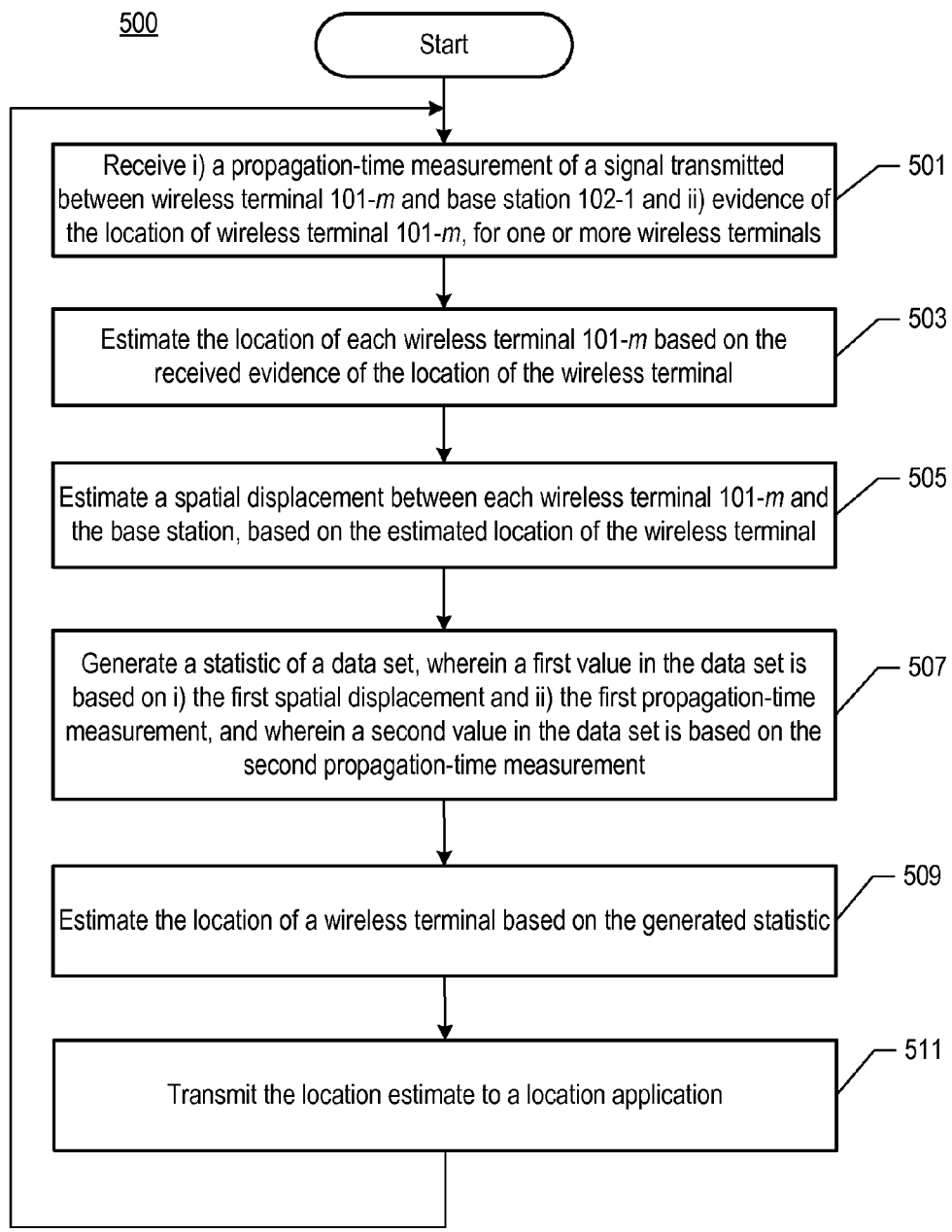
FIG. 5 depicts a flowchart of the salient processes performed in accordance with the illustrative embodiment of the present invention.

Processor 401 is a general-purpose processor that is configured to execute an operating system and the application software that performs the operations described herein, including the operations described in FIG. 5 and other figures. Processor 401 is also capable of populating, amending, using, and managing propagation-time measurements, data sets based on the measurements, statistics of each data set, and so on. It will be clear to those skilled in the art how to make and use processor 401.

Memory 402 is a non-volatile memory that is configured to store:
 a. operating system 411, and
 b. application software 412, and
 c. database 413 for storing one or more data sets as described below.

It will be clear to those skilled in the art how to make and use memory 402.

Receiver and transmitter 403 is configured to enable location engine 113 to receive from and transmit to wireless terminal 101-m, wireless infrastructure 111, location-based application server 112, and the base stations (i.e., cellular and WiFi), in well-known fashion. It will be clear to those skilled in the art how to make and use receiver and transmitter 403.

Operation of the Illustrative Embodiment—FIG. 5 depicts a flowchart of the salient processes performed in accordance with the illustrative embodiment of the present invention.

The processes performed by wireless telecommunications system 100 of the illustrative embodiment are depicted in the drawings (i.e., FIG. 5 and subsequent figures) as being performed in a particular order. It will, however, be clear to those skilled in the art, after reading this disclosure, that such operations can be performed in a different order than depicted or can be performed in a non-sequential order (e.g., in parallel, etc.). In some embodiments of the present invention, some or all of the depicted processes might be combined or performed by different devices, either within location engine 113 or other than location engine 113. In some embodiments of the present invention, some of the depicted processes might be omitted.

For purposes of clarity, wireless terminal 101-1 and cellular base station 102-1 are used as examples of a wireless terminal and base station. However, as those who are skilled in the art will appreciate after reading this specification, the tasks described below are applicable to other wireless terminals and other base stations (e.g., WiFi, etc.) as well.

At task 501, location engine 113 receives one or more propagation-time measurements (e.g., round-trip time, etc.), wherein each measurement is that of a signal in a transmission between wireless terminal 101-1 and base station 102-1. Measurements can be received for signals between multiple wireless terminals and a given base station, for signals between a given wireless terminal and multiple base stations, and for signals across multiple paths between each wireless terminal and base station, in any combination thereof. The measurements can be representative of signals from a base station to a wireless terminal, or from a wireless terminal to a base station, or both. In some embodiments of the present invention, a propagation-time measurement can be received in response to location engine 113 transmitting a mobile-terminated location request (MTLR) message, or equivalent.

The propagation-time measurements actually received by location engine 113 are based on the propagation-time-related measurements provided by terminal 101-1 as described above and in FIG. 2. In some embodiments of the present invention, one or more of the propagation-time measurements received by location engine 113 are further based on a predetermined constant. For example and without limitation, a wireless service provider in control of system 100 might choose to adjust (i.e., by a "fudge factor") one or more of the measurements provided by wireless terminal 101-1, in order to compensate for known signal paths within the equipment itself, such as signal path 304 that is characterized by a first propagation delay component. In this example, the service provider might attempt to correct by subtracting out the delay effects introduced by signal path 304, in order to obtain a measurement that is more representative of one or more signal paths between antenna element 301 and wireless terminal 101-1, instead of between radio 303 and the wireless terminal.

Location engine 113 also receives evidence of the location of one or more wireless terminals, such as terminal 101-1. Evidence of a location is data to which a location estimation algorithm can be applied in order to generate an estimated location (e.g., a geographic location, etc.). For example and without limitation, evidence of the location can comprise a signal-strength measurement, a time-related measurement, or information that, by itself, is not a representation of the geographic location of a wireless terminal, estimated or otherwise, but that is probative of the geographic location. In some alternative embodiments of the present invention, the evidence of a location can comprise a relatively coarse location, whereas the estimated location generated from the evidence can be a relatively fine location. The evidence of the location can be different from and independent of the propagation-time measurements, while concurrently the location to which the evidence applies can be coincident with the location at which and/or time interval during which the propagation-time characteristic was measured and/or reported.

Location engine 113 also receives evidence of the location of one or more of the base stations, such as base station 102-1. In some embodiments, location engine 113 receives a geographic location of one or more of the base stations, in which the location or locations have been confirmed to a known degree of accuracy.

At task 503, location engine 113 estimates the geographic location of wireless terminal 101-1 based on the received evidence of the location of terminal 101-1, thereby establishing a "ground truth" for the location of the terminal. Engine 113 can estimate the location of other wireless terminals as well, thereby also establishing ground truths for those terminals. There are various techniques that can be used to estimate the location of wireless terminal 101-1 based on the received evidence. See for example and without limitation, U.S. Pat. Nos. 6,944,465, 7,460,505, 7,383,051, 7,257,414, 7,753,278, 7,433,695, 7,848,762, and 8,630,665, each of which is incorporated by reference herein. Location engine 113, in some embodiments of the present invention, can receive an estimate of the geographic location of wireless terminal 101-1 in which the estimate has been calculated elsewhere (e.g., by wireless terminal 101-1 itself, etc.). In some embodiments of the present invention, the uncertainties of one or more grounds truths are included as a component of the analysis represented by method 500.

At task 505, location engine 113 estimates a spatial displacement (e.g., shortest distance, etc.) between wireless terminal 101-1 and base station 102-1 based on the estimated location of terminal 101-1. Engine 113 can estimate the spatial displacements between other combinations of wireless terminals and base stations as well. In some embodiments of the present invention, evidence of the location of base station 102-1, the location itself of base station 102-1, or the location of antenna element 301 is also used in estimating the spatial displacement.

At task 507, location engine 113 generates a statistic of a data set. Task 507 is described in detail below and in FIG. 6.

At task 509, location engine 113 estimates the location of a different wireless terminal than terminal 101-1, such as terminal 101-2, based on the statistic generated at task 507. In some embodiments of the present invention, engine 113 refines the estimate of the location of wireless terminal 101-1 based on the statistic generated at task 507. A location estimate of the wireless terminal is made available as a result of this task.

Location engine 113 can determine the location of the wireless terminal in the following manner. Once the statistic is made available at task 507, engine 113 can use that statistic, or a second statistic based on the first statistic, to further adjust each propagation-time measurement being reported so that the propagation-time measurement can be directly used in a meaningful way to determine location. The adjusted and improved propagation-time measurement can then be directly used as part of one or more well-known techniques for location determination (e.g., OTDOA, Cell ID+RTT, etc.), in order to provide an improved location estimate compared with a location estimate obtained by using the unadjusted propagation-time measurements.

In some embodiments of the present invention, the location estimate is based on concurrent or simultaneous propagation-time measurements between a wireless terminal and more than one base station. For example, analysis of the correlated measurements can add to the precision of the estimate.

At task 511, location engine 113 transmits the location estimate that was made available at task 509, to a location application at application server 112. In some embodiments of the present invention, engine 113 transmits the location estimate to a device different from server 112 or uses the location estimate for its own purposes.

Location engine 113 then repeats one or more of the aforementioned tasks.

Figure 6:
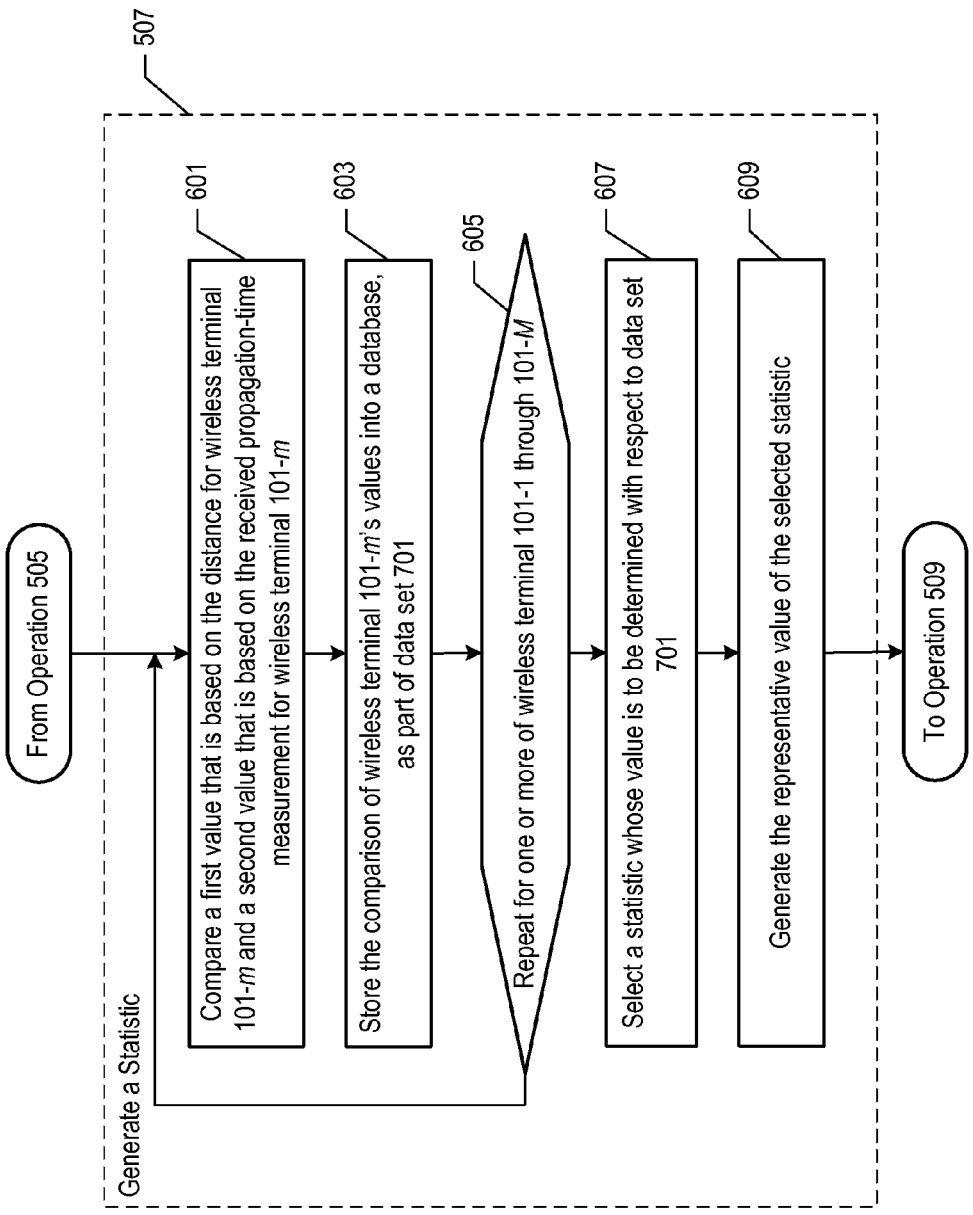
FIG. 6 depicts a flowchart of the salient processes performed in accordance with task 507.

Task 507: Generate a Statistic—FIG. 6 depicts a flowchart of the salient processes performed in accordance with task 507.

At task 601, location engine 113 compares a first value based on the spatial displacement value estimated at task 505, with a second value based on the propagation-time measurement received at task 501, resulting in a comparison value.

In accordance with the illustrative embodiment, the comparison comprises a calculation of the difference between the first value and the second value, wherein the first and second values have been normalized or converted into comparable units of measure. For example and without limitation, the first value is obtained by converting a spatial distance measurement to a time-related measurement, based on the time it takes for a radio signal to span the one-way spatial distance. As part of this example, the second value is obtained by converting its propagation-time-related value to a time-related value consistent with that of the first value, such as by taking a round-trip-time (RTT) measurement, in chips, and converting it to a one-way-time value in nanoseconds.

In regard to wireless propagation components 305 through 307 in FIG. 3, in some embodiments of the present invention one or both of the first and second values might be adjusted in order to account for the probability of the propagation-time measurement not being representative of a direct-path radio signal, but of the measurement being influenced by an indirect-path or a multipath radio signal. Alternatively, such an adjustment for indirect-path or multipath can be performed later as described below.

As those who are skilled in the art will appreciate after reading this specification, the comparison described above can be performed in a different way than calculating a difference or in different units of measure, or both.

Figure 7:
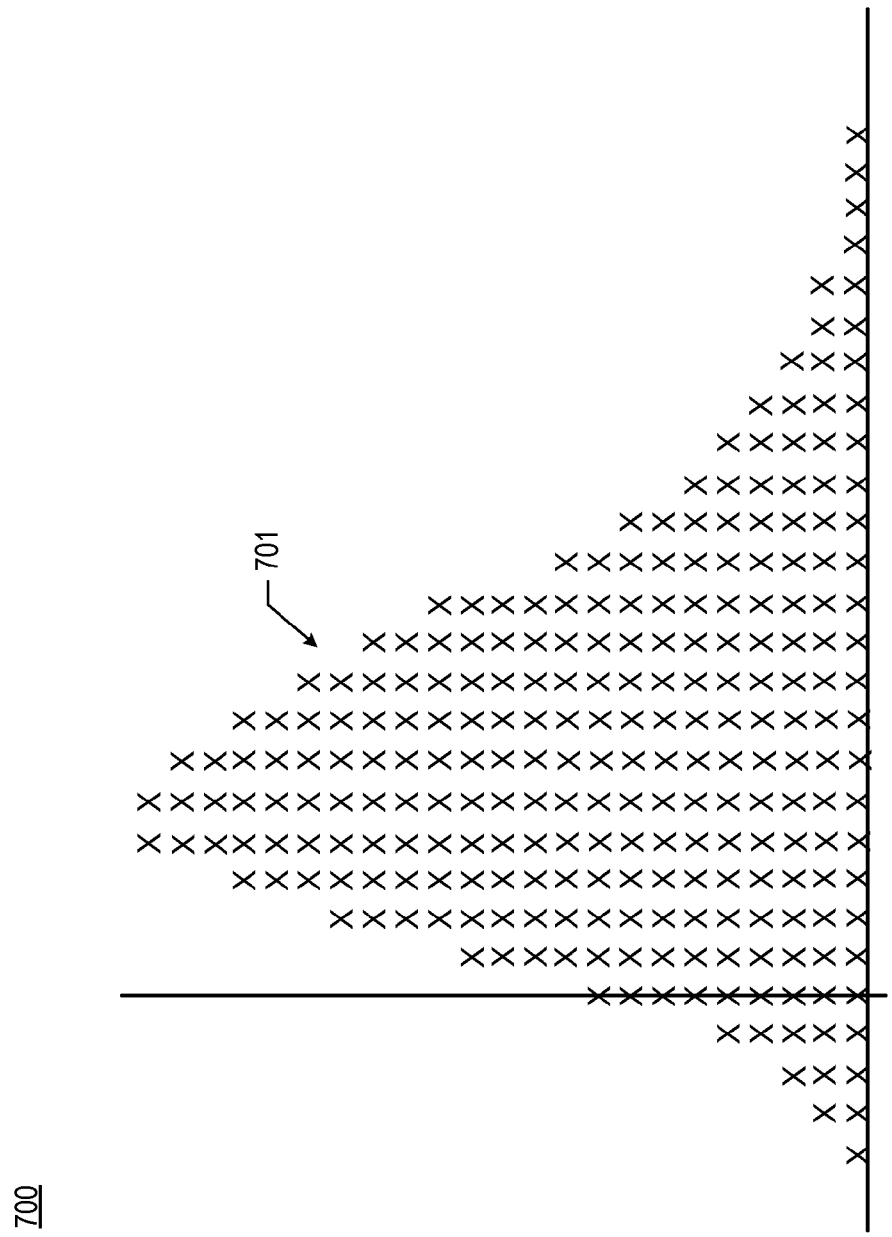
FIG. 7 depicts a probability distribution 700 of data set 701, developed as a histogram and generated at task 601.

At task 603, location engine 113 stores the result of the comparison between the first and second values, in memory 402's database, in order to build a data set 701 as depicted in FIG. 7 described below.

At task 605, location engine 113 repeats aforementioned tasks 601 and 603 in order to ensure that number of values that constitute data set 701 is sufficient. FIG. 7 depicts a probability distribution 700 of data set 701, developed as a histogram of multiple comparison values generated at task 601, which are being stored into memory at task 603. Data set 701 can comprise comparison values that are representative only of a single wireless terminal/base station pair, representative of multiple wireless terminals with respect to a single base station, representative of one or more wireless terminals with respect to multiple base stations, and so on.

Some characteristics of data set 701 are discussed here. First, the depicted data set extends over to the left side of the y-axis. One situation in which this can occur is when the service provider has overcorrected, in the propagation-time measurement data delivered to location engine 113, for electrical delays in the equipment (e.g., cabling, antenna amplifiers, etc.) that are present in path 304 of FIG. 3. Second, the depicted data set exhibits some positive skewness (i.e., skewness to the right). One situation in which this can occur is when some multipath is present in the coverage area or areas from which the data originates.

The comparison values that constitute data set 701 can depend on various factors. For example and without limitation, data set 701 might be developed from comparison values in which some or all of the base stations, in a predetermined group of base stations, are represented in those constituent comparison values, if one of more of the following apply:
  a. similar radio-frequency (RF) propagation conditions (e.g., multipath, etc.) are present in the coverage areas of the base stations.
  b. similar base station equipment configurations (e.g., sectorization, etc.) exist.
  c. similar propagation-time corrections made by the service provider are in effect.

On the other hand, data set 701 might instead be developed from comparison values in which only a single base station, or a limited group of similar base stations, is represented in those constituent comparison values, if one or more of the following apply:
  a. different RF propagation conditions are present.
  b. different base station equipment configurations exist.
  c. different corrections made by the service provider are in effect.

At task 605, location engine 113 determines when a sufficient number of comparison values have been accumulated as part of data set 701. It will be clear to those who are skilled in the art after reading this specification, how to determine when a sufficient number has been accumulated. This might depend, for example, one or more sources of error such as the quantization error of the propagation-time (e.g., RTT, etc.) measurements made by the wireless terminals.

At task 607, location engine 113 selects one or more statistical algorithms whose resulting statistical values are to be determined with respect to one or more of the values in data set 701. In some embodiments of the present invention, a to-be-determined statistic can be a descriptive statistic, in which case the statistic can be summary statistic or can be based on a summary statistic. Summary statistics include, while not being limited to:
  a. a measure of location within data set 701—arithmetic mean, median, mode, interquartile mean, a predetermined percentile, etc.
  b. a measure of statistical dispersion within data set 701—standard deviation, variance, range, interquartile range, absolute deviation, distance standard deviation, etc.
  c. a measure of the shape of the distribution of data set 701—skewness, distance skewness, etc.

As those who are skilled in the art will appreciate after reading this specification, the statistic can be selected based on one or more of: the RF environment (e.g., multipath that is present, etc.), the base station or stations involved (i.e., transmitting and/or receiving signals), the wireless terminal or terminals involved (i.e., transmitting and/or receiving signals), any correction or offset applied by the service provider, or trial-and-error, for example and without limitation.

At task 609, location engine 113 generates a first statistic by applying one or more corresponding, predetermined statistical algorithms to a data set, in well-known fashion. In some embodiments, engine 113 can adjust the generated statistic accordingly or calculate a value of an additional statistic or characteristic of data set 701 based on the first statistic. For example and without limitation, if the skewness of data set 701 indicates the presence of strong multipath (i.e., a distinct, positive skewness is observed), then the characteristic of data set 701 for which a value is calculated and eventually provided to task 509 might be a first characteristic. However, if the skewness of data set 701 indicates the presence of weak or no multipath (i.e., a slight skewness or no skewness is observed), then the characteristic of data set 701 for which a value is calculated and eventually provided to task 509 might be a second characteristic. As multipath might vary significantly from one cell of coverage to another, the mere presence of skewness might dictate that separate data sets be maintained and analyzed for each base station.

After task 609, control of task execution then proceeds to task 509.

As those who are skilled in the art will appreciate after reading this specification, a representation of a data set can be used that is alternative to the probability distribution representation depicted in FIG. 7. Moreover, a method of calculating a correction can be used that is alternative to generating a statistic of a data set.

Figure 8:
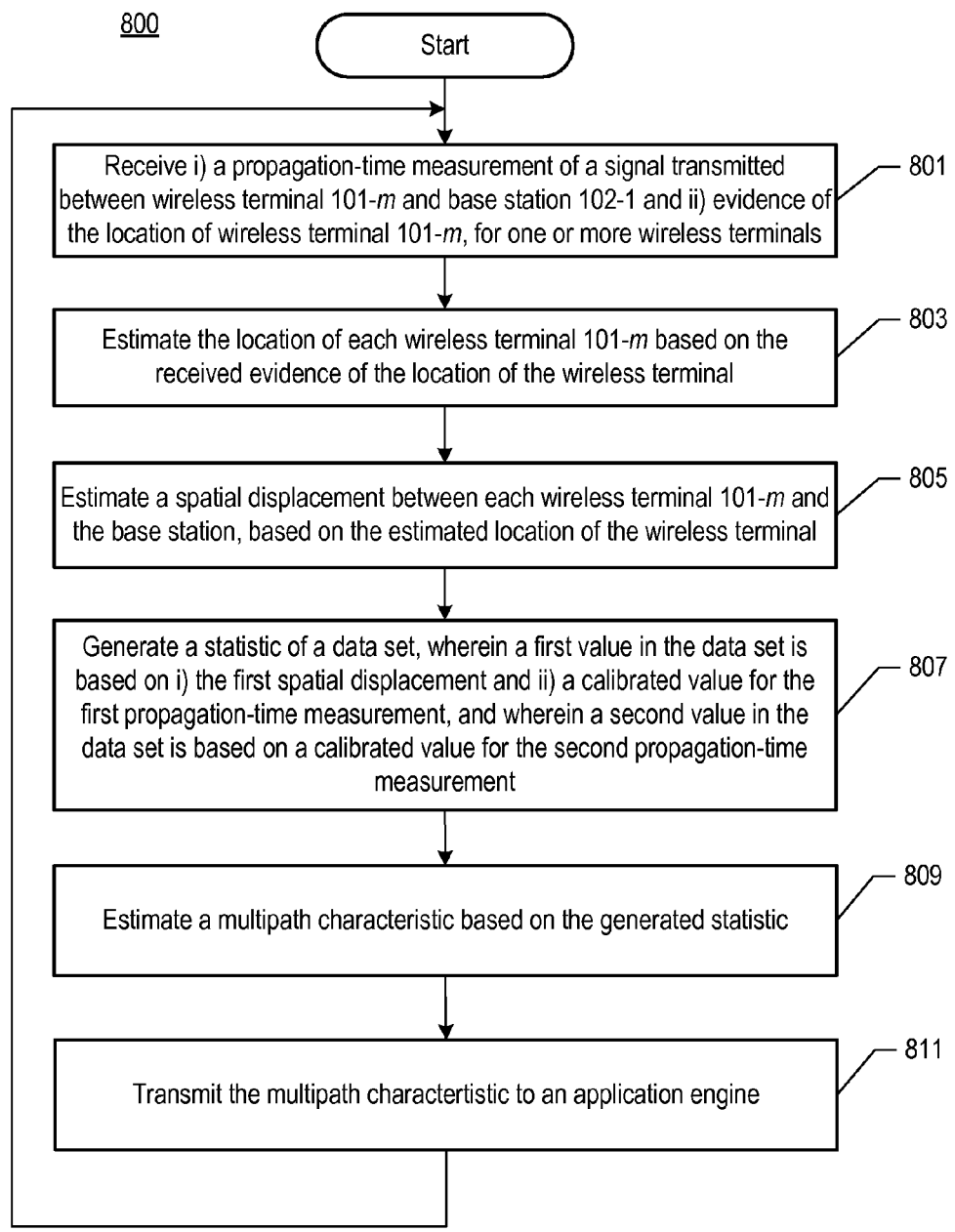
FIG. 8 depicts a flowchart of the salient processes performed in characterizing multipath.

In some embodiments of the present invention, location engine 113 can determine one or more multipath characteristics of a wireless coverage area based on one or more of the tasks described here. FIG. 8 depicts a flowchart of the salient processes performed in characterizing multipath, or one or more RF propagation paths in general.

For purposes of clarity, wireless terminal 101-1 and cellular base station 102-1 are used as examples of a wireless terminal and base station. However, as those who are skilled in the art will appreciate after reading this specification, the tasks described below are applicable to other wireless terminals and other base stations (e.g., WiFi, etc.) as well.

At task 801, location engine 113 receives one or more propagation-time measurements (e.g., round-trip time, etc.), wherein each measurement is that of a signal in a transmission between wireless terminal 101-1 and base station 102-1. Measurements can be received for signals between multiple wireless terminals and a given base station, for signals between a given wireless terminal and multiple base stations, and for signals across multiple paths between each wireless terminal and base station, in any combination thereof. The measurements can be representative of signals from a base station to a wireless terminal, or from a wireless terminal to a base station, or both.

The propagation-time measurements actually received by location engine 113 are based on the propagation-time-related measurements provided by terminal 101-1 as described above and in FIG. 2. In some embodiments of the present invention, one or more of the propagation-time measurements received by location engine 113 are further based on a predetermined constant, as discussed above and in task 501.

Location engine 113 also receives evidence of the location of one or more wireless terminals, such as terminal 101-1. For example and without limitation, evidence of the location can comprise a signal-strength measurement, a time-related measurement, or information that, by itself, is not a representation of the geographic location of a wireless terminal, estimated or otherwise, but that is probative of the geographic location. The evidence of the location can be different from and independent of the propagation-time measurements, while at the same time the location to which the evidence applies can correspond to the location at which the propagation-time characteristic was measured and/or reported.

Location engine 113 also receives evidence of the location of one or more of the base stations, such as base station 102-1. In some embodiments, location engine 113 receives a geographic location of one or more of the base stations, in which the location or locations have been confirmed to a known degree of accuracy.

At task 803, location engine 113 estimates the geographic location of wireless terminal 101-1 based on the received evidence of the location of terminal 101-1, thereby establishing a "ground truth" for the location of the terminal. Engine 113 can estimate the location of other wireless terminals as well, thereby also establishing ground truths for those terminals. There are various techniques that can be used to estimate the location of wireless terminal 101-1 based on the received evidence. See for example and without limitation, U.S. Pat. Nos. 6,944,465, 7,460,505, 7,383,051, 7,257,414, 7,753,278, 7,433,695, 7,848,762, and 8,630,665, each of which is incorporated by reference herein. In some embodiments of the present invention, the uncertainties of one or more grounds truths are included as a component of the analysis represented by method 800.

At task 805, location engine 113 estimates a spatial displacement (e.g., shortest distance, etc.) between wireless terminal 101-1 and base station 102-1 based on the estimated location of terminal 101-1. Engine 113 can estimate the spatial displacements between other combinations of wireless terminals and base stations as well. In some embodiments of the present invention, evidence of the location of base station 102-1, the location itself of base station 102-1, or the location of antenna element 301 is also used in estimating the spatial displacement.

At task 807, location engine 113 generates a statistic of a data set. Task 807 is similar to task 507 described in detail above and in FIG. 6, with an important difference. Instead of using the propagation-time measurements as described in task 601, location engine 113 in task 807 uses calibrated propagation-time measurements. The calibrated propagation-time measurements are generated by taking each propagation-time measurement as received by the location engine from wireless infrastructure 111 and adjusting the measurement. The measurement is adjusted such that any propagation delay attributed to the equipment at base station 102-1 and/or attributed to any correction attempted by the wireless service provider is removed from the received propagation-time measurement. The rationale for doing this is to remove any errors attributed to the base station and wireless infrastructure, thereby making the calibrated propagation-time measurement a true representation of the electromagnetic signal's propagation delay over the air (i.e., between the wireless terminal and base station antenna element). As those who are skilled in the art will appreciate after reading this specification, the calibrated propagation-time measurements can be derived, at least in part, by accurately measuring the equipment delay for the specific equipment involved and/or by obtaining the service provider's correction factor, if any.

At task 809, location engine 113 estimates a multipath characteristic based on the statistic generated at task 807. For example, as discussed above and in FIG. 7, depicted data set 701 exhibits some positive skewness (i.e., skewness to the right). One situation in which this can occur is when some multipath is present in the coverage area or areas from which the data originates. Accordingly in this example, skewness might be the statistic generated at task 807—more specifically, selected at task 607 and generated at task 609—from which the multipath characteristic can be generated. This skewness statistic can then be compared, for example and without limitation, to various reference statistics that are stored in a database, in order to characterize the multipath that is present.

At task 811, location engine 113 transmits the estimated multipath characteristic that was made available at task 809, to an application (e.g., an RF engineering application, etc.). In some embodiments of the present invention, engine 113 uses the characteristic for its own purposes.

Location engine 113 then repeats one or more of the aforementioned tasks.

Figure 9:
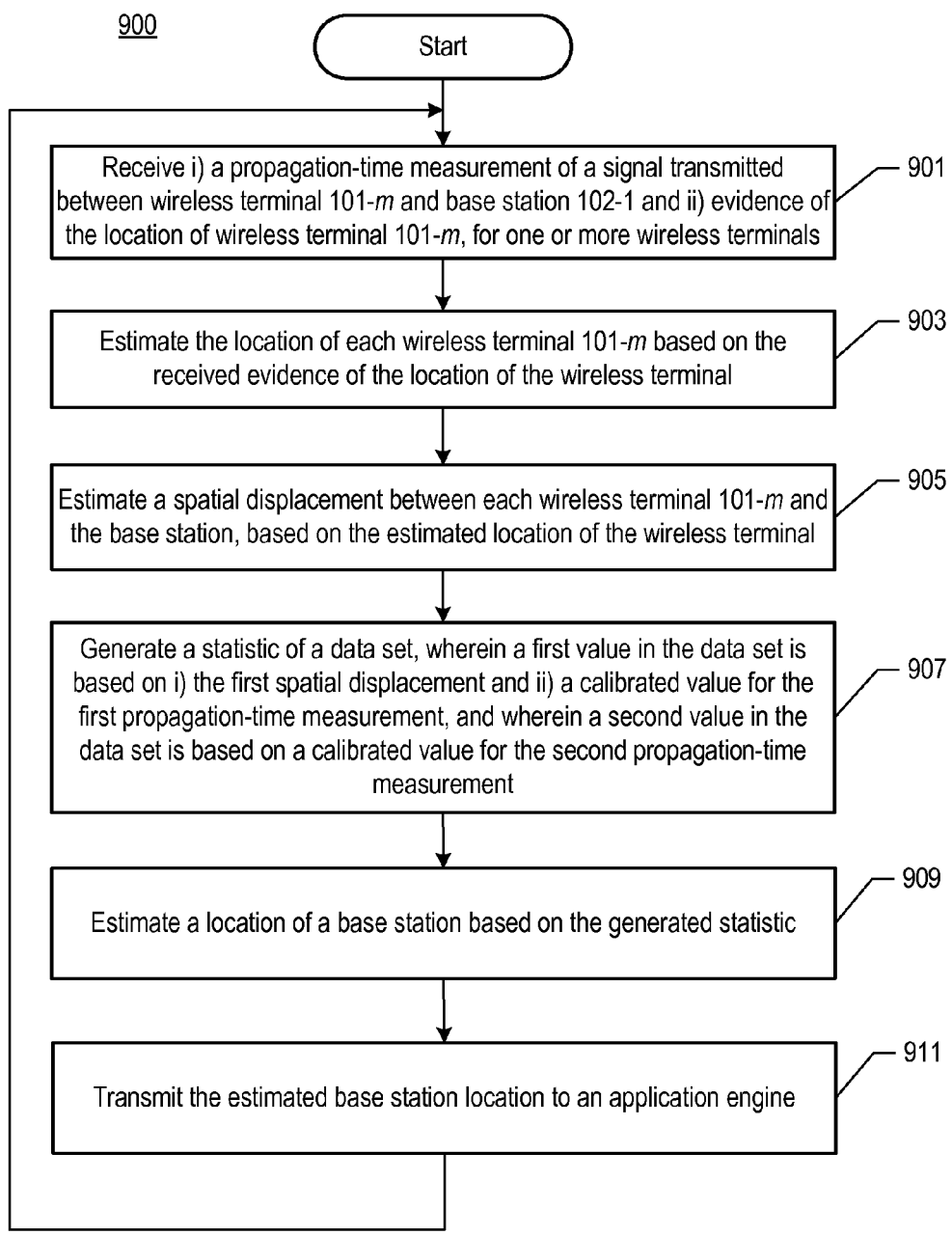
FIG. 9 depicts a flowchart of the salient processes performed in estimating the location of a base station.

In some embodiments of the present invention, location engine 113 can determine estimate a more accurate location of one or more base stations based on one or more of the tasks described here. FIG. 9 depicts a flowchart of the salient processes performed in estimating the location of a base station.

For purposes of clarity, wireless terminal 101-1 and cellular base station 102-1 are used as examples of a wireless terminal and base station. However, as those who are skilled in the art will appreciate after reading this specification, the tasks described below are applicable to other wireless terminals and other base stations (e.g., WiFi, etc.) as well.

At task 901, location engine 113 receives one or more propagation-time measurements (e.g., round-trip time, etc.), wherein each measurement is that of a signal in a transmission between wireless terminal 101-1 and base station 102-1. Measurements can be received for signals between multiple wireless terminals and a given base station, for signals between a given wireless terminal and multiple base stations, and for signals across multiple paths between each wireless terminal and base station, in any combination thereof. The measurements can be representative of signals from a base station to a wireless terminal, or from a wireless terminal to a base station, or both.

The propagation-time measurements actually received by location engine 113 are based on the propagation-time-related measurements provided by terminal 101-1 as described above and in FIG. 2. In some embodiments of the present invention, one or more of the propagation-time measurements received by location engine 113 are further based on a predetermined constant, as discussed above and in task 501.

Location engine 113 also receives evidence of the location of one or more wireless terminals, such as terminal 101-1. For example and without limitation, evidence of the location can comprise a signal-strength measurement, a time-related measurement, or information that, by itself, is not a representation of the geographic location of a wireless terminal, estimated or otherwise, but that is probative of the geographic location. The evidence of the location can be different from and independent of the propagation-time measurements, while at the same time the location to which the evidence applies can correspond to the location at which the propagation-time characteristic was measured and/or reported.

Location engine 113 also receives evidence of the location of one or more of the base stations, such as base station 102-1. In some embodiments, location engine 113 receives a geographic location of one or more of the base stations, in which the location or locations have been confirmed to a known degree of accuracy. For pedagogical purposes, however, the location of least one base station (e.g., base station 102-2, etc.) is either unknown or is known only to an inadequate degree of accuracy.

At task 903, location engine 113 estimates the geographic location of wireless terminal 101-1 based on the received evidence of the location of terminal 101-1, thereby establishing a "ground truth" for the location of the terminal. Engine 113 can estimate the location of other wireless terminals as well, thereby also establishing ground truths for those terminals. There are various techniques that can be used to estimate the location of wireless terminal 101-1 based on the received evidence. See for example and without limitation, U.S. Pat.

Nos. 6,944,465, 7,460,505, 7,383,051, 7,257,414, 7,753,278, 7,433,695, 7,848,762, and 8,630,665, each of which is incorporated by reference herein. In some embodiments of the present invention, the uncertainties of one or more grounds truths are included as a component of the analysis represented by method 900.

At task 905, location engine 113 estimates a spatial displacement (e.g., shortest distance, etc.) between wireless terminal 101-1 and base station 102-1 based on the estimated location of terminal 101-1. Engine 113 can estimate the spatial displacements between other combinations of wireless terminals and base stations as well. In some embodiments of the present invention, evidence of the location of base station 102-1, the location itself of base station 102-1, or the location of antenna element 301 is also used in estimating the spatial displacement.

At task 907, location engine 113 generates a statistic of a data set. Task 907 is similar to task 507 described in detail above and in FIG. 6, with an important difference. Instead of using the propagation-time measurements as described in task 601, location engine 113 in task 907 uses calibrated propagation-time measurements. The calibrated propagation-time measurements are generated by taking each propagation-time measurement as received by the location engine from wireless infrastructure 111 and adjusting the measurement. The measurement is adjusted such that any propagation delay attributed to the equipment at base station 102-1 and/or attributed to any correction attempted by the wireless service provider is removed from the received propagation-time measurement. The rationale for doing this is to remove any errors attributed to the base station and wireless infrastructure, thereby making the calibrated propagation-time measurement a true representation of the electromagnetic signal's propagation delay over the air (i.e., between the wireless terminal and base station antenna element). As those who are skilled in the art will appreciate after reading this specification, the calibrated propagation-time measurements can be derived, at least in part, by accurately measuring the equipment delay for the specific equipment involved and/or by obtaining the service provider's correction factor, if any.

In some embodiments of the present invention, location engine 113 estimates a multipath characteristic based on the statistic generated at task 907 and further adjusts the propagation-time measurement in order to generate the calibrated propagation-time measurement. For example, as discussed above and in FIG. 7, depicted data set 701 exhibits some positive skewness (i.e., skewness to the right). One situation in which this can occur is when some multipath is present in the coverage area or areas from which the data originates. Accordingly in this example, skewness might be the statistic from which the multipath characteristic can be estimated and processed as described earlier.

At task 909, location engine 113 estimates the location of a base station whose location is unknown or is known only to an inadequate degree of accuracy (e.g., base station 102-2, etc.) based on the statistic generated at task 907. In some embodiments of the present invention, engine 113 can instead refine the evidence of the location of base station 102-1 discussed earlier, based on the statistic generated at task 907.

Location engine 113 can determine the location of the base station in the following manner. Once the statistic is made available at task 907, engine 113 can use that statistic to further adjust each calibrated propagation-time measurement so that the measurement can be directly used in a meaningful way to determine the base station's location. Recognizing that the ground-truth locations of one or more wireless terminals are already available as a result of task 903, these ground truths, in combination with the adjusted, calibrated propagation-time measurement, can be used as part of one or more well-known techniques for location determination (e.g., OTDOA, Cell ID+RTT, etc.), but with an important difference. In this difference, it is the wireless terminal locations that are known and the base station location that is unknown or inaccurate prior to execution of this task, instead of the other way around.

At task 911, location engine 113 transmits the location estimate that was made available at task 909, to an application engine. In some embodiments of the present invention, location engine 113 uses the location estimate for its own purposes (e.g., to update its base station location database, etc.).

Location engine 113 then repeats one or more of the aforementioned tasks.

In some embodiments of the present invention, one might conclude in the first place that the stated location of a particular base station is incorrect, by modeling the spatial-displacement error statistics for multiple sectors (e.g., all sectors, etc.) of the base station. Method 900 can be invoked for the particular base station, for example, based on arriving at the foregoing conclusion.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving, by a server computer:
   i) a first propagation-time measurement of a first signal in a transmission between a first wireless terminal and a first base station,
   ii) a second propagation-time measurement of a second signal in a transmission that involves the first base station, and
   iii) evidence of the location of the first wireless terminal;
estimating, by the server computer, the location of the first wireless terminal based on the evidence of the location of the first wireless terminal;
estimating, by the server computer, a first spatial displacement between the first wireless terminal and the first base station, based on the estimated location of the first wireless terminal;
generating, by the server computer, a statistic by applying a corresponding, predetermined statistical algorithm to a data set, wherein a first value in the data set is based on i) the first spatial displacement and ii) the first propagation-time measurement, and wherein a second value in the data set is based on the second propagation-time measurement;
estimating, by the server computer, the location of a second wireless terminal based on the statistic, resulting in a location estimate; and
transmitting, by the server computer, the location estimate to a location-based application.

2. The method of claim 1 wherein the evidence of the location of the first wireless terminal comprises a signal-strength measurement.

3. The method of claim 1 wherein the evidence of the location of the first wireless terminal comprises a time measurement.

4. The method of claim 1 further comprising receiving iv) evidence of the location of the first base station, wherein the estimating of the first spatial displacement is further based on the evidence of the location of the first base station.

5. The method of claim 1 wherein any representation of geographic location of the first wireless terminal is absent from the evidence of the location of the first wireless terminal.

6. The method of claim 1 further comprising comparing a first numeric value that is based on the first spatial displacement and a second numeric value that is based on the first propagation-time measurement, wherein the generating of the statistic is based on the comparing of the first and second numeric values.

7. The method of claim 6 wherein the second numeric value is based on a one-way component of the first propagation-time measurement.

8. The method of claim 1 wherein the propagation-time measurement is based on at least one of i) a round-trip time (RTT) measurement and ii) a timing advance (TA) measurement.

9. The method of claim 8 wherein the propagation-time measurement is further based on a predetermined constant.

10. The method of claim 1 wherein the statistic is based on a multipath characteristic of a wireless coverage area serviced by the first base station.

11. The method of claim 1 wherein the second signal is in a transmission between a third wireless terminal and the first base station.

12. The method of claim 1 further comprising:
receiving, by the server computer, iv) a third propagation-time measurement of a third signal between the first wireless terminal and a second base station;
wherein the first and third propagation-time measurements are based on concurrent measurements of the first and third signals, respectively, and wherein the location of the second wireless terminal is further based on the third propagation-time measurement.

13. A method comprising:
receiving, by a server computer:
i) a first propagation-time measurement of a signal transmitted between a first wireless terminal and a first base station, and
ii) a second propagation-time measurement of a signal transmitted between a second wireless terminal and the first base station;
estimating, by the server computer:
i) a first spatial displacement between the first wireless terminal and the first base station, based on an estimated location of the first wireless terminal, and
ii) a second spatial displacement between the second wireless terminal and the first base station, based on an estimated location of the second wireless terminal;
generating, by the server computer, a statistic by applying a corresponding, predetermined statistical algorithm to a data set, wherein a first value in the data set is based on i) the first spatial displacement and ii) the first propagation-time measurement, and wherein a second value in the data set is based on i) the second spatial displacement and ii) the second propagation-time measurement;
estimating, by the server computer, the location of a third wireless terminal based on the statistic, resulting in a location estimate; and
transmitting, by the server computer, the location estimate to a location-based application.

14. The method of claim 13 further comprising:
receiving, by the server computer, iii) evidence of the location of the first wireless terminal; and
generating, by the server computer, the estimated location of the first wireless terminal based on the evidence of the location of the first wireless terminal.

15. The method of claim 14 wherein the evidence of the location of the first wireless terminal comprises a signal-strength measurement.

16. The method of claim 13 further comprising receiving iii) evidence of the location of the first base station, wherein the estimating of the first spatial displacement is further based on the evidence of the location of the first base station.

17. The method of claim 13 further comprising comparing a first numeric value that is based on the first spatial displacement and a second numeric value that is based on the first propagation-time measurement, wherein the generating of the statistic is based on the comparing of the first and second numeric values.

18. The method of claim 17 wherein the second numeric value is based on a one-way component of the first propagation-time measurement.

19. The method of claim 13 wherein the propagation-time measurement is based on at least one of i) a round-trip time (RTT) measurement and ii) a timing advance (TA) measurement.

20. The method of claim 13 wherein the statistic is based on a multipath characteristic of a wireless coverage area serviced by the first base station.

21. The method of claim 13 further comprising:
receiving, by the server computer, a iii) third propagation-time measurement of a signal transmitted between the first wireless terminal and a second base station;
wherein the location of the third wireless terminal is further based on the third propagation-time measurement.

22. A method comprising:
receiving, by a server computer:
i) a first propagation-time measurement of a signal transmitted between a first wireless terminal and a first base station,
ii) a second propagation-time measurement of a signal transmitted between a second wireless terminal and the first base station, and
iii) a third propagation-time measurement of a signal transmitted between the first wireless terminal and a second base station;
estimating, by the server computer:
i) a first spatial displacement between the first wireless terminal and the first base station, based on an estimated location of the first wireless terminal, and
ii) a second spatial displacement between the second wireless terminal and the first base station, based on an estimated location of the second wireless terminal;
generating, by the server computer, a statistic by applying a corresponding, predetermined statistical algorithm to a data set, wherein a first value in the data set is based on i) the first spatial displacement and ii) the first propagation-time measurement, wherein a second value in the data set is based on i) the second spatial displacement and ii) the second propagation-time measurement, and wherein a third value in the data set is based on the third propagation-time measurement;
estimating, by the server computer, the location of a third wireless terminal based on the statistic, resulting in a location estimate; and
transmitting, by the server computer, the location estimate to a location-based application.

* * * * *